United States Patent
Komatsu

(10) Patent No.: US 10,473,203 B2
(45) Date of Patent: Nov. 12, 2019

(54) VEHICLE DIFFERENTIAL HAVING AN ELECTROMAGNETIC ACTUATOR

(71) Applicant: GKN Automotive Limited, Worcestershire (GB)

(72) Inventor: Toshiaki Komatsu, West Bloomfield, MI (US)

(73) Assignee: GKN Automotive Limited, Worcestershire (GB)

( * ) Notice: Subject to any disclaimer, the term of this patent is extended or adjusted under 35 U.S.C. 154(b) by 111 days.

(21) Appl. No.: 15/838,941

(22) Filed: Dec. 12, 2017

(65) Prior Publication Data
US 2019/0178360 A1   Jun. 13, 2019

(51) Int. Cl.
*F16H 48/34* (2012.01)
*F16H 48/42* (2012.01)

(52) U.S. Cl.
CPC .............. *F16H 48/34* (2013.01); *F16H 48/42* (2013.01)

(58) Field of Classification Search
CPC ................................. F16H 48/34; F16H 48/42
USPC .................................................... 475/231, 331
See application file for complete search history.

(56) References Cited

U.S. PATENT DOCUMENTS

| 5,106,349 | A | * | 4/1992 | Botterill | F16D 43/216 |
| | | | | | 192/93 A |
| 6,460,677 | B1 | * | 10/2002 | Roscoe | F16D 27/115 |
| | | | | | 192/84.7 |
| 6,733,411 | B1 | * | 5/2004 | Kaplan | F16H 48/22 |
| | | | | | 192/103 F |
| 6,949,047 | B2 | * | 9/2005 | Okazaki | F16H 48/08 |
| | | | | | 475/231 |
| 6,958,030 | B2 | | 10/2005 | DeGowske | |
| 7,022,040 | B2 | | 4/2006 | DeGowske et al. | |
| 7,137,921 | B2 | | 11/2006 | DeGowske | |
| 7,201,696 | B2 | | 4/2007 | DeGowske | |
| 7,211,020 | B2 | | 5/2007 | Gohl et al. | |
| 7,384,359 | B2 | | 6/2008 | Pinkos | |
| 7,507,176 | B2 | | 3/2009 | Pinkos | |
| 7,775,926 | B2 | * | 8/2010 | Sugaya | F16H 48/08 |
| | | | | | 475/85 |
| 7,780,565 | B2 | * | 8/2010 | Fusegi | F16H 48/08 |
| | | | | | 475/160 |
| 7,862,462 | B2 | * | 1/2011 | Fusegi | F16H 48/08 |
| | | | | | 475/231 |
| 7,878,314 | B2 | | 2/2011 | Pinkos | |
| 8,287,417 | B2 | * | 10/2012 | Sudou | F16H 48/08 |
| | | | | | 475/231 |
| 9,878,615 | B2 | * | 1/2018 | Kamitani | B60K 23/04 |

FOREIGN PATENT DOCUMENTS

JP         2004183874 A    7/2004

* cited by examiner

*Primary Examiner* — Leslie A Nicholson, III
(74) *Attorney, Agent, or Firm* — Jennifer M. Brumbaugh; Reising Ethington P.C.

(57) ABSTRACT

In at least some implementations, a vehicle differential includes a housing having a mounting flange with multiple openings through the flange, an annular gear mounted to the flange by a plurality of fasteners received through the openings, a coil received radially inwardly of the fasteners, and a coupler. The coupler is fixed to the housing and engaged with the coil to retain the position of the coil relative to the housing, and the coupler extends into an area between adjacent fasteners, where the area is circumferentially between adjacent fasteners and radially overlapped with at least a portion of the adjacent fasteners.

16 Claims, 5 Drawing Sheets

VEHICLE DIFFERENTIAL HAVING AN ELECTROMAGNETIC ACTUATOR

TECHNICAL FIELD

The present disclosure relates generally to a vehicle differential having an electromagnetic actuator.

BACKGROUND

During normal operation of a motor vehicle, it is common that all four wheels are not turning at an identical rate of speed. Different wheel turn rates are most commonly encountered when the vehicle is making a turn, but may also be caused by braking or non-uniform road surface conditions. In order to accommodate differing wheel turning rates while continuing to direct power to two wheels it is possible to provide a differential that allows for different wheel turn rates between the powered wheels. The differential allows the wheels to spin at different rates while transmitting torque to each wheel. While this solution may be satisfactory in some driving conditions, it is unsatisfactory under conditions where one of the driven wheels experiences a surface having a much lower coefficient of friction than a surface engaged by the other wheel(s). Such conditions may prevent the application of torque to a wheel with more traction, thereby resulting in undesired vehicle performance. A locking mechanism may be provided to lock the differential and prevent different wheel spin rates and transmit torque uniformly between two wheels in at least some circumstances.

SUMMARY

In at least some implementations, a vehicle differential includes a housing having a mounting flange with multiple openings through the flange, an annular gear mounted to the flange by a plurality of fasteners received through the openings, a coil received radially inwardly of the fasteners, and a coupler. The coupler is fixed to the housing and engaged with the coil to retain the position of the coil relative to the housing, and the coupler extends into an area between adjacent fasteners, where the area is circumferentially between adjacent fasteners and radially overlapped with at least a portion of the adjacent fasteners.

In at least some implementations, the coupler is fixed to the housing by a fastener and the fastener is at least partially received in the area. A radially outer edge of the coupler may have a circumferential width that is less than the minimum circumferential distance between the two fasteners that the coupler is received between. And the outer edge of the coupler may be curved or arcuate and the coupler may have a reduced width at the outer edge compared to a radially inner edge of the coupler.

In at least some implementations, the coupler includes a plate and a radially outer edge of the plate is received in the area and a radially inner edge of the plate either is engaged with a radially outer surface of the coil or radially overlaps the coil. The housing may include a stop surface adjacent to the coupler that limits rotation of the coupler relative to the housing. And the coupler may be fixed to the housing by a fastener and the plate may have a radially inner edge with a first point that is radially closer to the fastener than a second point of the inner edge spaced from the first point so that rotation of the plate relative to the housing moves the second point radially inwardly toward the coil.

In at least some implementations, a vehicle differential includes a housing, an annular gear carried by the housing, multiple fasteners coupling the gear to the housing, a coil and a coupler. The housing has a rotational axis, a flange extending radially between a radially inner edge and a radially outer edge, and multiple openings that extend axially through the flange. The gear is carried by the housing and has multiple voids each aligned with a respective one of the openings. The fasteners each have an enlarged head that engages the flange and a shank that is received through a respective one of the openings and into a respective one of the voids to connect the gear to the flange. The coil has a casing and is received radially inwardly of the fasteners. And the coupler is fixed to the housing and engaged with the casing to retain the position of the coil relative to the housing, the coupler extends into an area that is circumferentially between adjacent fasteners and wherein a radially outer edge of the coupler is at a distance from the axis that is greater than the minimum distance from the axis to the fasteners adjacent to the coupler.

In at least some implementations, the coupler is fixed to the housing by a fastener and the fastener is at least partially received in the area. The coupler may include a plate and a radially outer edge of the plate may be received in the area and a radially inner edge of the plate either is engaged with a radially outer surface of the casing or radially overlaps the casing. The housing may include a stop surface adjacent to the coupler that limits rotation of the coupler relative to the housing. The coupler may be fixed to the housing by a fastener and the plate has a radially inner edge with a first point that is radially closer to the fastener than a second point of the inner edge spaced from the first point so that rotation of the plate relative to the housing moves the second point radially inwardly toward the coil. A radially outer edge of the coupler may have a circumferential width that is less than the minimum circumferential distance between the two fasteners that the coupler is received between. And the outer edge of the coupler may be arcuate and the coupler may have a reduced width at the outer edge compared to a radially inner edge of the coupler.

BRIEF DESCRIPTION OF THE DRAWINGS

The following detailed description of preferred embodiments and best mode will be set forth with reference to the accompanying drawings, in which.

DETAILED DESCRIPTION

Figure 1:
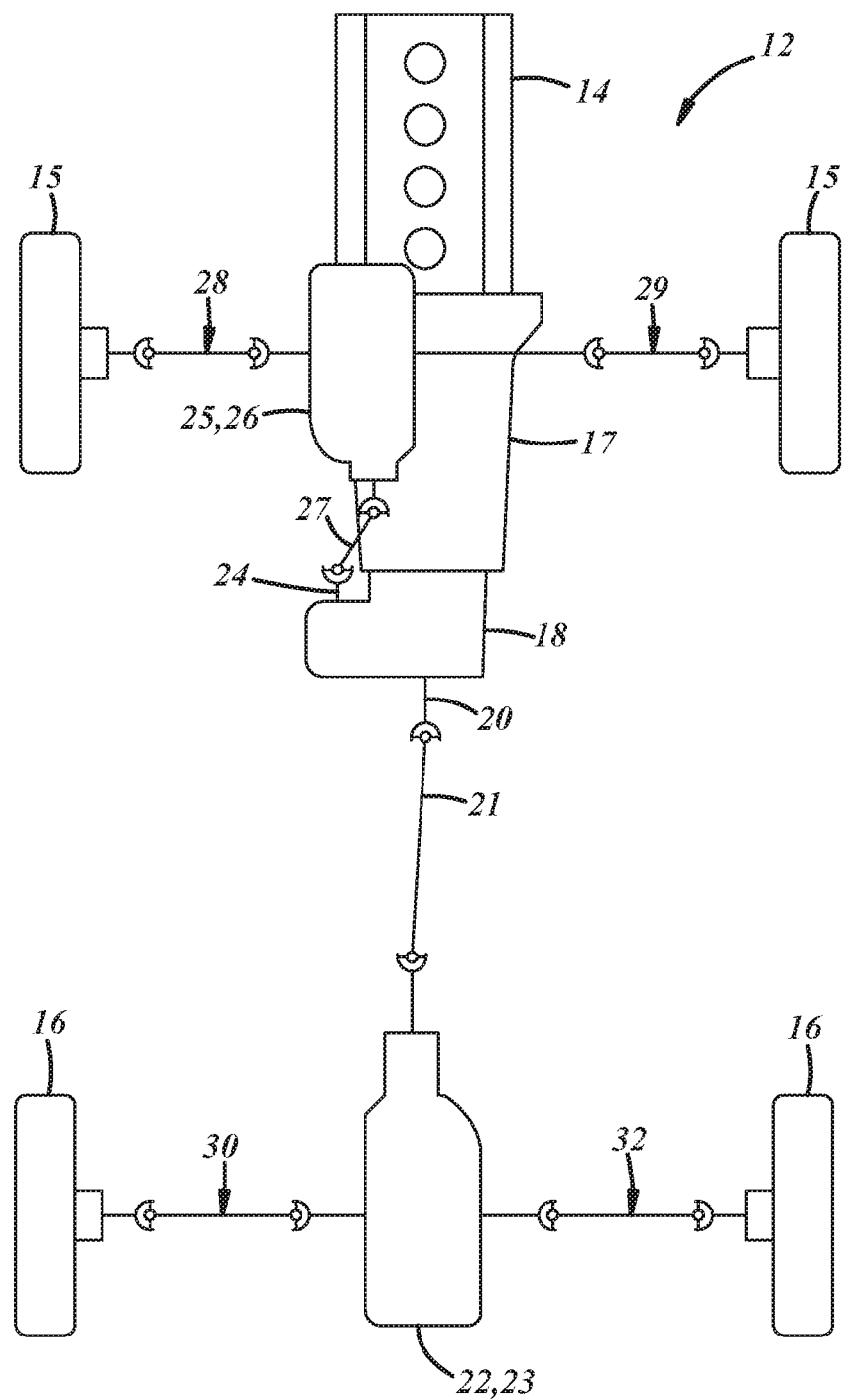
FIG. 1 is a schematic diagram of a vehicle driveline assembly.

Referring in more detail to the drawings, FIG. 1 illustrates a vehicle driveline 12 that provides power from an engine 14 to multiple wheels including front wheels 15 and rear wheels 16. The engine 14 supplies torque via a transmission 17 and a power transfer unit 18 that provides an output shaft 20. The output shaft 20 is coupled to a first prop shaft 21 which is coupled to a rear drive unit 22 that may include a differential assembly 23. The power transfer unit 18 or other device may have an output shaft 24 coupled to a front drive unit 25 (which may include a differential assembly 26) via a second prop shaft 27. Front left and right side shafts 28, 29 are coupled to the drive unit/differential 25, 26 which permits relative rotation between the side shafts 28, 29 and front wheels 15. Rear left and right side shafts 30, 32 are coupled to the rear drive unit/differential 22, 23 which permits relative rotation between the side shafts 30, 32 and rear wheels 16. The power transfer unit 18 may include a disconnect assembly that, when in a connected state, transfers torque to the second prop shaft 27 to drive the front wheels 15. When connected or disconnected, the power transfer unit 18 may provide torque to the first prop shaft 21 to drive the rear wheels 16. Thus, depending upon the state of the disconnect device, the driveline 12 may provide torque to the rear wheels 16 only or to all four of the wheels 15, 16. Of course, other driveline configurations may be used, as desired.

Figure 2:
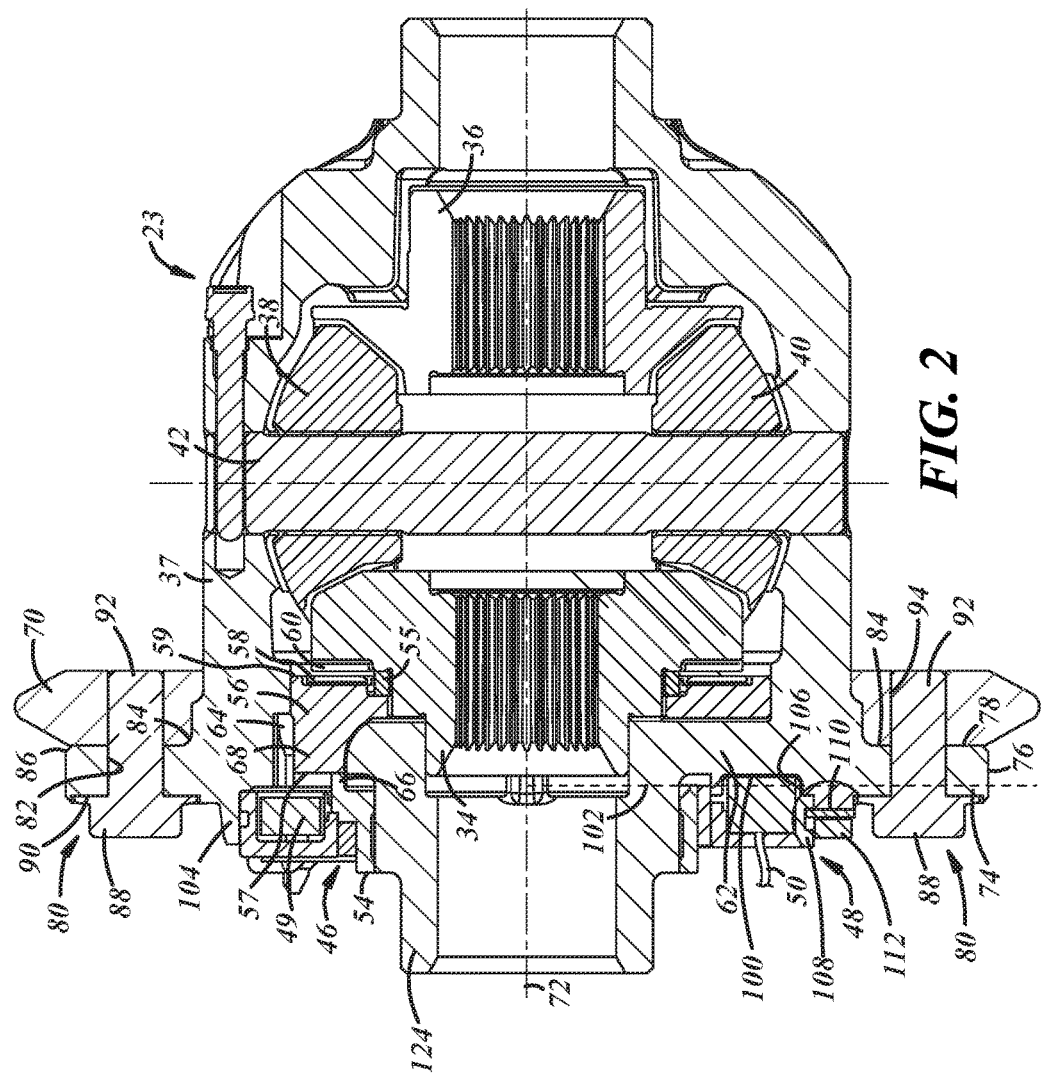
FIG. 2 is a cross-sectional view of a differential with an electrically actuated locking mechanism, wherein the differential is shown in an open position.

Referring now to FIG. 2, the first rear side shaft 30 is connected to a first side gear 34 within the differential 23. Similarly, the second rear side shaft 32 is connected to a second side gear 36 within the differential 23. The differential 23 includes side gears 34, 36 that are generally carried within a housing 37 of the differential 23 and are rotatably coupled to the side shafts 30, 32, respectively. The differential also includes pinion gears 38, 40 that are meshed with side gears 34, 36, respectively, and which are mounted within the housing 37 on a pinion shaft 42.

To selectively lock and unlock the differential 23 a locking mechanism 46 is provided. The locking mechanism 46 may have actuated and deactuated states, and in one state the locking mechanism couples one of the side shafts (e.g. 32) to the differential housing 37 so that the coupled side shaft rotates with the housing. This, in turn, causes the other side shaft 30 to rotate in unison with the housing 37 and the side shaft 32 coupled to the housing so that both side shafts 30, 32 rotate at the same speed.

In at least some implementations, the locking mechanism 46 is electrically actuated and includes a solenoid 48 having an annular wire coil 49 and a drive member that may include an armature or plunger 54 received at least partially within the coil. In at least some implementations, the plunger 54 is also annular, the plunger and coil 49 are coaxially arranged and carried by the housing 37 for rotation with the housing, and one side shaft (here, the second side shaft 32) extends coaxially through the coil and plunger. Electric power is supplied to the coil 49 via a power wire 50 to generate a magnetic field that displaces the plunger 54 relative to the coil from a first or retracted position to a second or advanced position. To facilitate return of the plunger 54 from the second position back to the first position when power is not provided to the coil 49, a biasing member, such as a spring 55 may act on the plunger 54, or on a component engaged with the plunger, as set forth below. In at least some implementations, the locking mechanism 46 is actuated when the plunger 54 is in the second position and the locking mechanism is deactuated when the plunger is in the first position. While in the example shown the plunger 54 is in its second position when power is provided to the coil 49 and the plunger moves to the first position when power is not supplied to the coil, the opposite could be true if desired (e.g. the locking mechanism 46 could be moved to the actuated position by the biasing member 55 and deactuated by powering the coil).

In at least some implementations, the locking mechanism 46 may further include or be associated with a lock member 56 adapted to be driven by the plunger 54 and to interface with the side gear 34 as set forth below. The lock member 56 may be generally annular and a portion of the second side gear 34 and/or shaft 32 may extend through the lock member. The lock member 56 may include a rear face 57 engageable by the plunger 54 and a front face 59 having at least one engagement feature 58, such as gear or clutch teeth (e.g. dog clutch teeth) configured to engage a corresponding engagement feature 60 (e.g. gear or dog clutch teeth) formed on a rear face of the first side gear 34. The spring 55 may act on the lock member 56 to urge the lock member into the plunger 54 and move the plunger to its first position when the coil 49 is not powered, as noted above. In the implementation shown, the plunger 54 is located adjacent to one side of a housing wall 62 and the lock member 56 is located adjacent to the other side of the wall 62. The wall 62 includes apertures 64, and the plunger 54 and lock member 56 include axially extending feet 66, 68 (e.g. FIGS. 2 and 3), respectively, that extend into or through the apertures 64 in the wall so that the plunger and lock member are engaged with each other across or through the wall. Like the coil 49 and plunger 54, the lock member 56 also is carried by and rotates with the housing 37.

The differential 23 illustrated in FIG. 2 is shown in an open mode or position. In the illustrated implementation, in the open position of the differential, the coil 49 is not powered, the plunger 54 is in its first position and the lock member 56 is not engaged with the side gear 34 so that the side gear can rotate relative to the lock member 56 and housing 37. In the open position, the side shafts 30, 32 may rotate at different speeds from one another. However, certain driving conditions may make it desirable for the side shafts 30, 32 to rotate in unison such that torque is applied to both wheels.

In the locked position, the coil 49 is powered, the plunger 54 is advanced to its second position which drives the lock member 56 into engagement with the side gear 34 (i.e. teeth 58 engage teeth 60). Hence, the side gear 34 is coupled to the housing 37 so that the side gear rotates with and not relative to the housing. In effect, the second side shaft 32 is locked to and rotates with the housing 37, which in turn forces the first side shaft 30 and the second side shaft 32 to rotate in unison.

As shown in FIG. 2, the plunger 54 may be formed from one or more materials in one or more bodies that are coupled together for movement together. One of the materials or bodies may be magnetically responsive to the magnetic field generated by the coil 49 so that when the magnetic field is generated by the coil 49, the plunger 54 may be driven from one position to another (e.g. from the retracted to the advanced position). As used herein, a material is responsive to a magnetic field if a magnetic field of the magnitude generated by a solenoid 48 of the type used in applications such as that described herein, may cause a component formed of or including such material to be displaced. In the example set forth herein, the plunger 54 needs to move between the advanced and retracted positions with sufficient force and speed to permit effective operation of the locking mechanism 46. Thus, while all materials may be affected in some way by a magnetic field, especially a field of great strength or magnitude, not all materials are magnetically responsive as that term is used in this disclosure.

For example, iron, nickel and cobalt are often cited as being magnetically responsive as they are relatively strongly affected by magnetic fields. While not limited to steel, one material of the plunger 54 may include various grades of steel which are known to be ferromagnetic and relatively strongly magnetically responsive. Conversely, materials like wood, plastic and glass are often cited as being not magnetically responsive as they are very weakly affected/attracted by magnetic fields. Of course, magnetically responsive materials may be combined with materials that are not magnetically responsive to create a component that is magnetically responsive (e.g. by mixing magnetic materials into a polymeric material).

Figure 4:
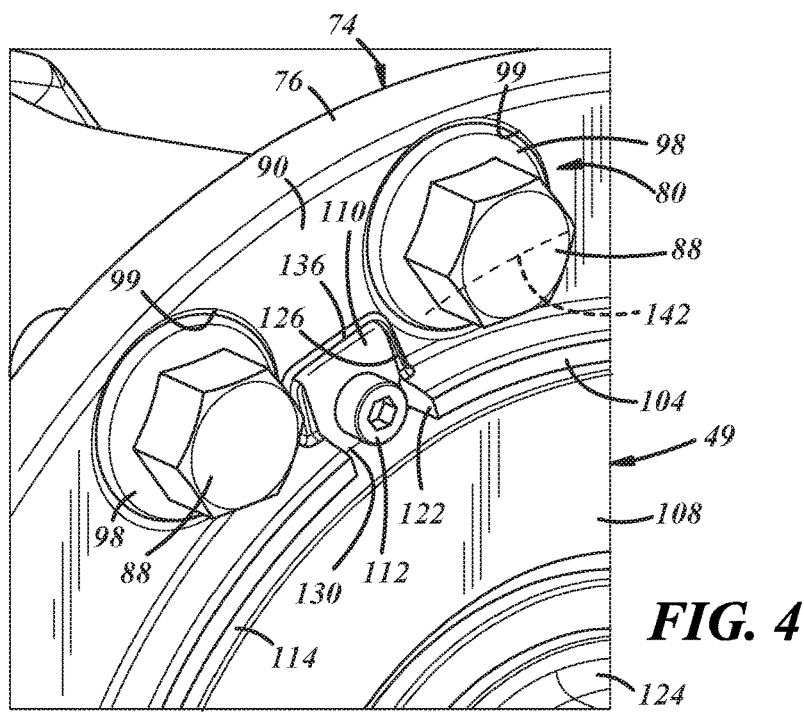
FIG. 4 is an enlarged, perspective view of a portion of the differential showing a coupler and a portion of a coil of an electromagnetic actuator.

To drive the differential 23 for rotation, a drive gear 70, such as an annular ring gear, may be coupled to the differential housing 37. The drive gear 70 may engage another gear so that the drive gear and differential housing 37 are driven for rotation about a center axis 72 that is common to both the drive gear and housing. In at least some implementations, the housing 37 includes a radially outwardly extending flange 74 that is cantilevered from the housing and extends to a radially outer surface 76. The flange 74 may have a drive gear mounting face 78 that may extend perpendicularly to the axis 72 and to the radially outer surface 76. The ring gear 70 may be fixed to the flange 74 by a plurality of fasteners 80 (e.g. machine screws or bolts as shown in FIGS. 2 and 4) that are received through a plurality of circumferentially spaced apart holes 82 that extend through the flange.

The holes 82 and the fasteners 80 received in them may extend generally axially through the flange 74 and may be received between radially inner and radially outer edges 84, 86 of the flange, where the radially inner surface 84 may be in blended connection with the differential housing 37. The fasteners 80 may include an enlarged head 88 that engages one side 90 of the flange 74 (e.g. the side 90 opposite the mounting face 78) and a threaded shank 92 that extends through the flange. Each shank 92 may be received in or through void 94 in the drive gear (e.g. a threaded blind bore or through hole for receipt of a nut).

Figure 3:
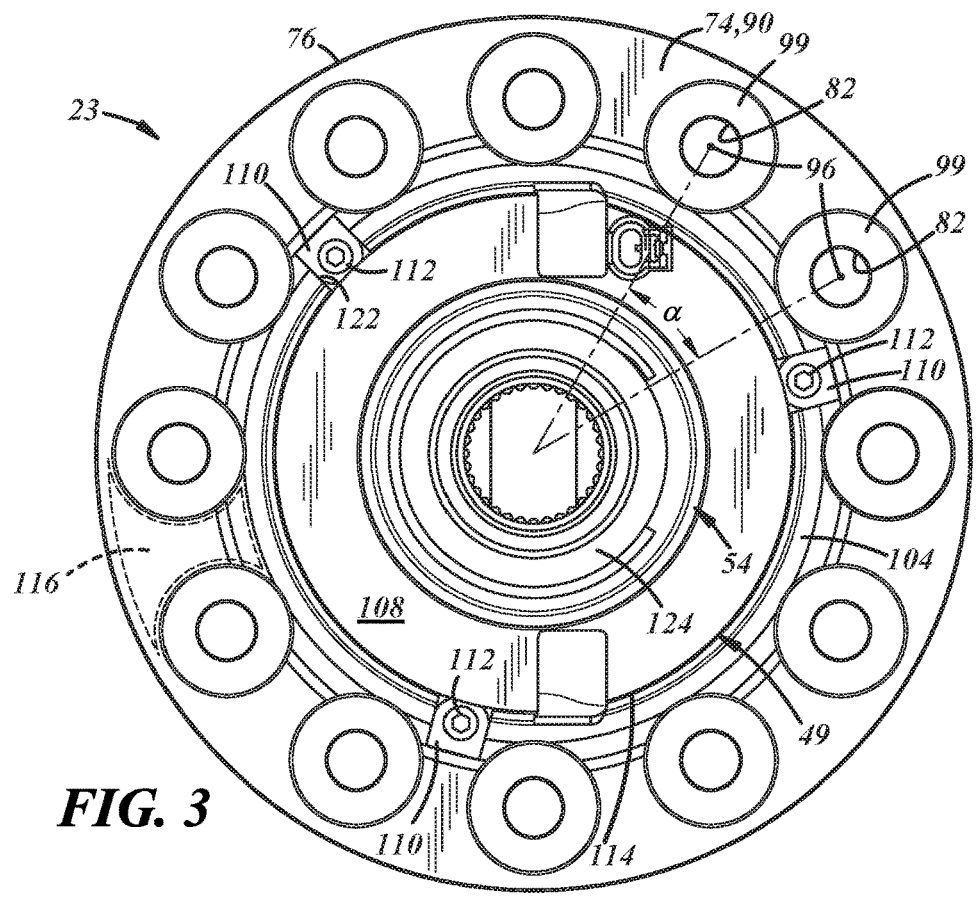
FIG. 3 is an end view of the differential.

In at least some implementations, the holes 82 may be evenly spaced apart about the circumference of the flange 74, by an angle α (FIG. 3) of between 25 and 45 degrees, where the angle α is measured between the axes 96 of adjacent holes 82. In the example shown, the head 88 includes an enlarged flange 98 at its base that, in assembly, is received against the side 90 of the flange 74 and provides a larger surface area over which the forces applied to the flange by or through the fastener 80 are distributed. In this example, the minimum spacing between adjacent fasteners 80 is between the radially outer edges of the flanges 98 of adjacent fasteners. As shown in FIGS. 3 and 4, the flange 74 may include counterbores 99 surrounding the holes 82 and arranged to received the flanges 98 of the fasteners 80.

Figure 5:
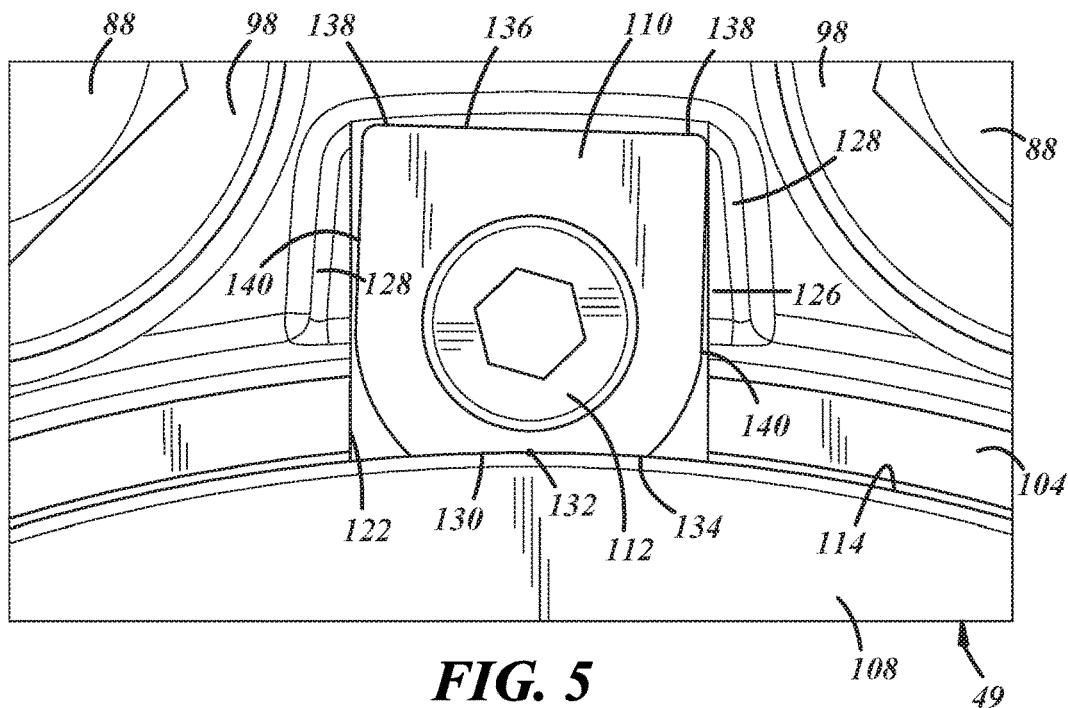
FIG. 5 is an enlarged end view of a portion of the differential showing the coupler.

In at least some implementations, the housing 37 may include a coil mounting surface 100 radially inboard of the flange 74, and which may axially overlap part of the flange. That is, a line 102 extending radially from the axis 72 may intersect both the coil 49 and the flange 74. The housing 37 may include an axially extending flange, ridge or wall 104 that radially separates the coil 49 from the flange 74, as shown in FIGS. 3-5, and/or the housing may include an annular channel 106 in which a portion of the coil is received. The channel 106 may have a radial width sufficient to receive the coil 49 and any desired axial depth. The coil 49 may include a cover or casing 108 that is at least partially received within the channel 106 (if provided), radially inwardly or inboard of the fasteners 80, and coupled to the housing 37 by one or more couplers 110.

The couplers 110 may overlie a portion of the coil casing 108 and a portion of the housing 37, and may be fixed to the housing, such as by a machine screw or other fastener 112 (and a coupler may also be considered to include the fastener or fasteners 112 used with each coupler). In at least some implementations, the couplers 110 include a thin plate having a radial extent sufficient to be coupled to the housing 37 and also engage or overlie a radially outer portion of the coil casing 108. In this regard, the coil casing 108 may include a radial flange or one or more radially outwardly extending tabs, each of which is overlapped by a separate one of the couplers. That is, more than one coupler may be provided and they may be circumferentially spaced apart to overlie the coil casing at multiple locations, such as the three locations shown in FIG. 3. Or, the couplers may simply radially engage a radially outer surface 114 of the casing 108.

In at least some implementations, at least part of the coupler 110 and/or the fastener 112 holding the coupler to the housing 37 may be located in an area 116 between the gear fasteners 80. A plurality of areas 116 may be provided, and one is shown bounded by dashed lines in FIG. 3. Each area 116 may extend circumferentially between adjacent fasteners 80 and at a radial distance between the radial outermost and radial innermost portions 118, 120 of the fasteners. That is, the areas 116 may be located circumferentially between the heads 88 of the fasteners 80 and radially overlapped with (but laterally of circumferentially spaced from) the heads of the fasteners. In this way, a majority of each coupler 110 may be located on the flange 74, that is, between the inner and outer edges 84, 86 of the flange, and radially outboard of the coil 49 and the coil mounting surface 100 of the housing 37. In at least some implementations, the couplers 110 may extend into the area between adjacent fasteners and may radially overlap between 10% and 100% of the diameter of the fastener heads 88. When an axially extending wall 104 is provided between the flange 74 and the coil mounting surface 100, a gap or opening 122 may be provided through the wall 104 for each coupler 110, so that the couplers may extend from the flange 74 to the coil casing 108 without having to go over the wall 104. Further, the couplers 110 may have a circumferential width that is less than the circumferential distance between adjacent fasteners 80 (e.g. the heads 88) so that the couplers do not engage the fastener heads. In at least some implementations, the couplers 110 have a width that is less than 95% of the circumferential distance between adjacent fasteners 80 to provide clearance between the couplers 110 and fasteners 80 (e.g. the heads 88). Further, a clearance may be provided between the coupler fastener 112 and the fasteners 80 that retain the gear 70. Thus, a tool, such as a wrench or socket, may be received over the fastener heads 88 without interference from the coupler fastener 112.

The radially outboard location of the couplers 110 may permit use of a coil 49 having a larger outer diameter and the coil may as a result include more wire which may improve the strength of the magnetic field generated by the coil and thus, the responsiveness of the plunger 54 and the overall performance of the locking mechanism 46. Also or instead, the coil 49 may have a larger inner diameter which permits use of a plunger 54 having a larger outer diameter and in turn, a larger inner diameter. A larger inner diameter for the plunger 54 permits the differential housing boss 124 (FIGS. 2-4) on which the plunger 54 is received to be thicker and stronger. Also or instead, the coil 49 may have a larger outer diameter and can be made axially thinner.

In at least some implementations, as shown in FIG. 5, recesses 126 are provided in the housing 37 for each coupler 110. The recesses 126 have an axial depth, include or are bounded by sidewalls 128, and may be formed at least partially in the flange 74. The recesses 126 may be sized for a relatively close fit with the coupler 110 so that the recesses provide stop surfaces that limit rotation of the coupler relative to the housing 37 and coil casing 108, to maintain a desired engagement between the couplers and the coil casing. In particular, as the coupler fastener 112 is tightened down, the coupler 110 may tend to rotate due to the increasing friction and forces applied to the coupler 110 by the fastener 112 (sliding friction due to relative rotation of the fastener creates a drag torque on the coupler). These forces are opposed by engagement of the coupler 110 with a wall 128 of the recess 126 to maintain a desired orientation and location of the coupler. Further, the recesses 126 restrain the coupler 110 against moving radially away from the coil 49 such that any rotation as the fastener 112 is tightened tends to rotate a portion of the coupler radially toward and into firmer engagement with the coil casing 108. In at least some implementations, the coupler 110 has a radially inner edge 130 with a first point 132 (which may be a circumferential mid-point) that is radially closer to the fastener 112 (or an opening in the coupler through which the fastener extends) than a second point 134 of the inner edge spaced from the first point (e.g. toward or at a corner of the coupler between a side edge and the inner edge). Rotation of the plate 110 relative to the housing 37 as the fastener 112 is tightened moves the second point 134 radially inwardly toward the coil casing 108 to more firmly engage and retain the coil. In this way, a single fastener 112 may be used for each coupler 110 as a second point of contact spaced from the fastener is provided to prevent undue rotation of the coupler. Because only one fastener 112 is needed to secure each coupler 110, the couplers 110 can be smaller (radially and/or circumferentially) than if multiple fasteners were needed.

In the implementation shown in FIGS. 3-5, the coupler plates 110 are generally flat, planar and rectangular. A radially outer edge 136 of the coupler 110 includes corners 138 at or near right angles which join sides 140 of the coupler 110, and the couplers have a generally constant circumferential width. As the couplers 110 extend closer to a radial mid-point of the fastener heads 88 (denoted by dashed line 142 in FIG. 4), the circumferential distance between the heads 88 becomes less (and is at a minimum at the mid-point) and the clearance between the coupler 110 and the heads becomes less. Further, the planar coupler plate 110 engages the radially outer surface 114 of the coil casing 108 to retain the coil on the housing.

Figure 6:
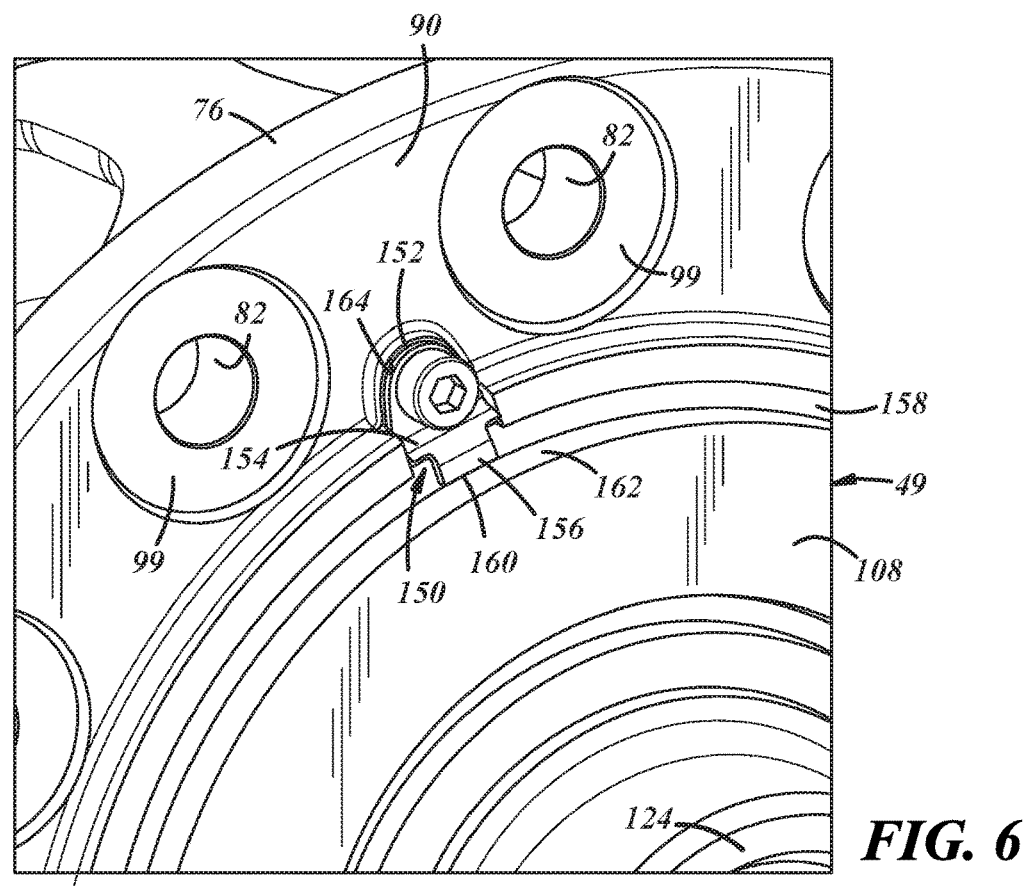
FIG. 6 is an enlarged, perspective view of a portion of the differential showing a coupler for a coil.
Figure 7:
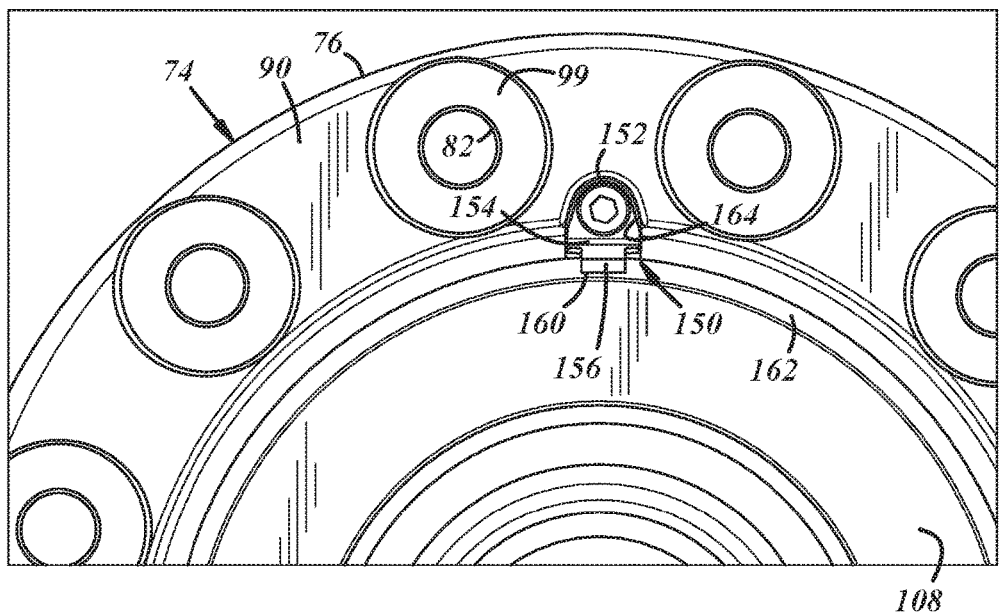
FIG. 7 is an enlarged end view of a portion of the differential showing the coupler of FIG. 6.

In the implementation shown in FIGS. 6 and 7, the couplers 150 have a radially outer edge 152 that is curved or not linear and the couplers have a minimum width at the radially outer edge and are wider radially spaced from the outer edge. In this way, more clearance is provided between the fastener heads 88 and the coupler 150 at the radially outer edge 152. The couplers 150 may be shaped as desired to provide a desired clearance between each coupler, the coupler fastener 112, and the adjacent fastener heads 88 along the radial length of the couplers. In at least some implementations, the radially outer edge 152 of the coupler 150 has a circumferential width that is less than the minimum circumferential distance between the two fasteners 80 so that the coupler is received between. Among other things, this may facilitate accessing the fastener heads 88 with a tool, like a socket. Further, in the example shown, the coupler 150 is bent and has a hook that includes an axially extending portion 154 and a radially inwardly extending end 156 that overlaps part of the coil casing 108, which is shown as having an outer flange 158 of reduced axial thickness compared to the remainder of the casing. A radial inner edge 160 of the coupler 150 may engage an axially extending surface 162 of the coil casing 108. Thus, the coupler 150 may radially overlap, or radially engage, or both radially overlap and engage a portion of the coil casing 108. And the recess 164 for each coupler 150 may be formed complementary to the shape of the coupler, if desired, or suitable stop surfaces that limit or prevent rotation of the coupler about the fastener 112 may be provided without any axially extending recess, as desired.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. In the preceding description, various operating parameters and components are described for one or more example embodiments. These specific parameters and components are included as examples and are not meant to be limiting.

Reference in the preceding description to "one example," "an example," "one embodiment," "an embodiment", "an implementation" or "at least some implementations" means that a particular feature, structure, or characteristic described in connection with the example is included in at least one example or implementation including one or more but not necessarily all innovative features or components. References to various examples, embodiments or implementations do not necessarily refer to the same example, embodiment or implementation each time it appears.

The invention claimed is:

1. A vehicle differential, comprising:
   a housing having a mounting flange with multiple openings through the flange;
   an annular gear mounted to the flange by a plurality of fasteners received through the openings;
   a coil received radially inwardly of the fasteners; and
   a coupler fixed to the housing and engaged with the coil to retain the position of the coil relative to the housing, the coupler extending into an area between adjacent ones of the plurality of fasteners, where the area is circumferentially between said adjacent ones of the plurality of fasteners and radially overlapped with at least a portion of said adjacent ones of the plurality of fasteners.

2. The differential of claim 1 wherein the coupler is fixed to the housing by a fastener and the fastener is at least partially received in the area.

3. The differential of claim 1 wherein the coupler includes a plate and a radially outer edge of the plate is received in the area and a radially inner edge of the plate either is engaged with a radially outer surface of the coil or radially overlaps the coil.

4. The differential of claim 3 wherein the housing includes a stop surface adjacent to the coupler that limits rotation of the coupler relative to the housing.

5. The differential of claim 4 wherein the coupler is fixed to the housing by a fastener and the radially inner edge of the plate has a first point that is radially closer to the fastener than a second point of the inner edge spaced from the first point so that rotation of the plate relative to the housing moves the second point radially inwardly toward the coil.

6. The differential of claim 1 wherein a radially outer edge of the coupler has a circumferential width that is less than the minimum circumferential distance between the two fasteners that the coupler is received between.

7. The differential of claim 6 wherein the outer edge of the coupler is arcuate and the coupler has a reduced width at the outer edge compared to a radially inner edge of the coupler.

8. The differential of claim 7 wherein the coupler has an axially extending portion and a radially inwardly extending end, and wherein the end overlaps part of the coil.

9. A vehicle differential, comprising:
a housing having a rotational axis, a flange extending radially between a radially inner edge and a radially outer edge, and multiple openings that extend axially through the flange;
an annular gear carried by the housing having multiple voids each aligned with a respective one of the openings;
a plurality of fasteners, each fastener having an enlarged head that engages the flange and a shank that is received through a respective one of the openings and into a respective one of the voids to connect the gear to the flange;
a coil of an electromagnetic actuator that has a casing and is received radially inwardly of the fasteners; and
a coupler fixed to the housing and engaged with the casing to retain the position of the coil relative to the housing, the coupler extends into an area that is circumferentially between adjacent ones of the plurality of fasteners and wherein a radially outer edge of the coupler is at a distance from the axis that is greater than the minimum distance from the axis to the fasteners of said plurality of fasteners that are adjacent to the coupler.

10. The differential of claim 9 wherein the coupler is fixed to the housing by a fastener and the fastener is at least partially received in the area.

11. The differential of claim 9 wherein the coupler includes a plate and a radially outer edge of the plate is received in the area and a radially inner edge of the plate either is engaged with a radially outer surface of the casing or radially overlaps the casing.

12. The differential of claim 11 wherein the housing includes a stop surface adjacent to the coupler that limits rotation of the coupler relative to the housing.

13. The differential of claim 12 wherein the coupler is fixed to the housing by a fastener and the a radially inner edge of the plate has a first point that is radially closer to the fastener than a second point of the inner edge spaced from the first point so that rotation of the plate relative to the housing moves the second point radially inwardly toward the casing.

14. The differential of claim 9 wherein a radially outer edge of the coupler has a circumferential width that is less than the minimum circumferential distance between the two fasteners that the coupler is received between.

15. The differential of claim 14 wherein the outer edge of the coupler is arcuate and the coupler has a reduced width at the outer edge compared to a radially inner edge of the coupler.

16. The differential of claim 15 wherein the coupler has an axially extending portion and a radially inwardly extending end, and wherein the end overlaps part of the casing.

* * * * *